June 25, 1946.    S. C. PLUMMER    2,402,574
AIR PICK-UP SYSTEM
Original Filed Dec. 22, 1941    2 Sheets—Sheet 2

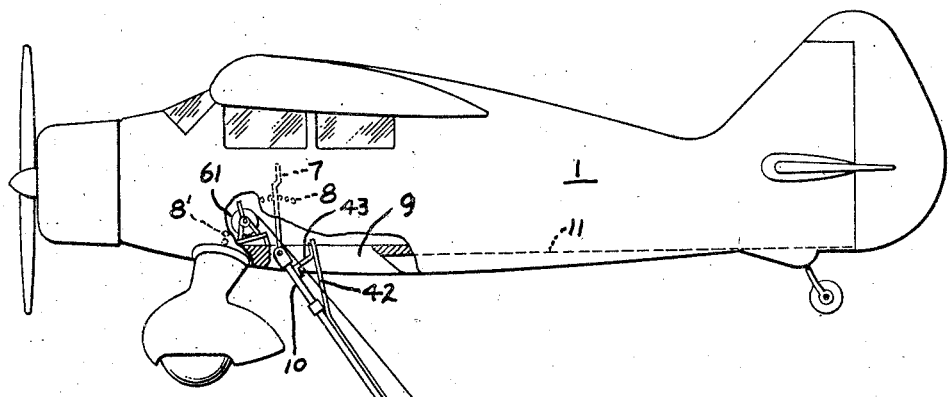
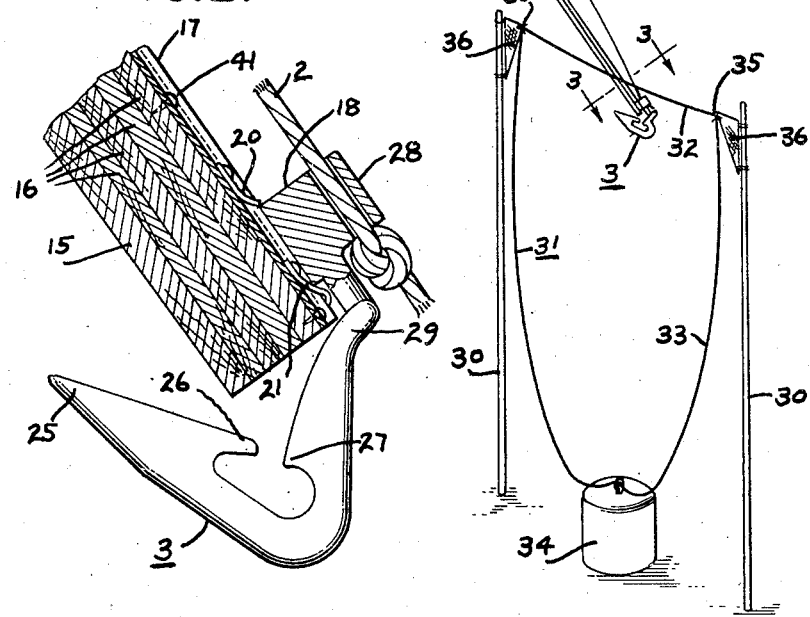

INVENTOR.
Stuart Crosby Plummer
BY Albert M. Austin
attorney

Patented June 25, 1946

2,402,574

UNITED STATES PATENT OFFICE 2,402,574

AIR PICKUP SYSTEM

Stuart Crosby Plummer, Akron, Ohio, assignor to All American Aviation, Inc., Wilmington, Del., a corporation of Delaware Original application December 22, 1941, Serial No. 423,999, now Patent No. 2,373,414, dated April 10, 1945. Divided and this application April 21, 1943, Serial No. 483,843

6 Claims. (Cl. 258—1.2)

This invention relates to aviation and more particularly to devices for picking up burdens from the ground by aircraft while in flight.

This application is a division of my application, Serial No. 423,999, filed December 22, 1941, entitled Air pickup system, now Patent No. 2,373,414, dated April 10, 1945.

The prior application discloses a complete air pick-up system for picking up burdens by an aircraft in flight. This system comprises, generally, a ground station having spaced poles, a ground loop releasably attached to said poles, with the burden attached to the ground loop. Cooperating equipment on the aircraft comprises a winch having an automatic brake controlled by unwinding the line wound on the winch. A special material is used either for the line wound on the winch, or for the ground loop, or for both having good elasticity, high elongation and sufficiently long elastic memory to prevent rebound or overshooting of the burden. The prior application also utilizes a novel form of pick-up arm and hook which forms the basis for the present application.

The present invention thus relates to a pick-up arm having a pick-up hook slidably mounted thereon for engaging the ground loop attached to the burden to be picked up. This pick-up arm and ground loop are preferably used with a pick-up system according to the prior application but obviously they are not limited to such use.

According to the form of the invention shown for purposes of illustration, the pick-up arm may be pivoted to the underside of the aircraft fuselage near the center of gravity of the craft. The pick-up arm is mounted at the forward side of a hatch located mainly on one side of the longitudinal center line of the plane. The pick-up arm has a guideway on the back on which slides a carrier or cleat supporting the pick-up hook which extends from the back of the arm around the side of the arm and projects out in front of the arm. The hook is provided with staggered barbs for preventing accidental disengagement of the ground loop.

The upper end of the guideway may diverge from the arm to facilitate placing the cleat or carrier thereon. The lower end of the guideway has suitable resilient devices to prevent the wind drag on the line from pulling the hook back up the arm after it has been let down to pick-up position. These resilient devices also permit the hook to be entirely disengaged from the arm upon contact with the ground loop.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 illustrates diagrammatically an airplane about to pick up a load from the ground station, according to the invention;

Fig. 2 is a longitudinal detail section through the end of the pick-up arm;

Like reference characters denote like parts in the several figures of the drawings.

Figure 3:
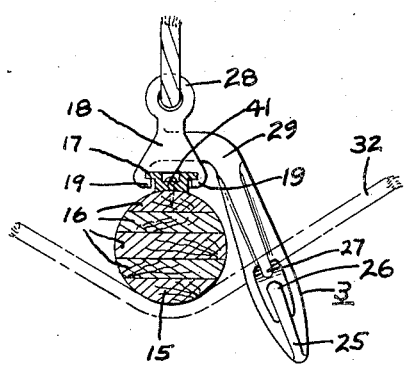
Fig. 3 is a cross-section on the line 3—3 of Fig. 1.
Figure 4:
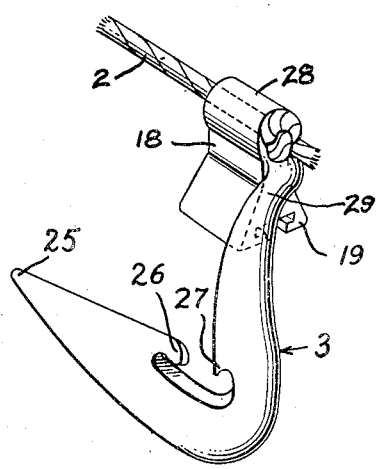
Fig. 4 is a detail of the pick-up hook.
Figure 5:
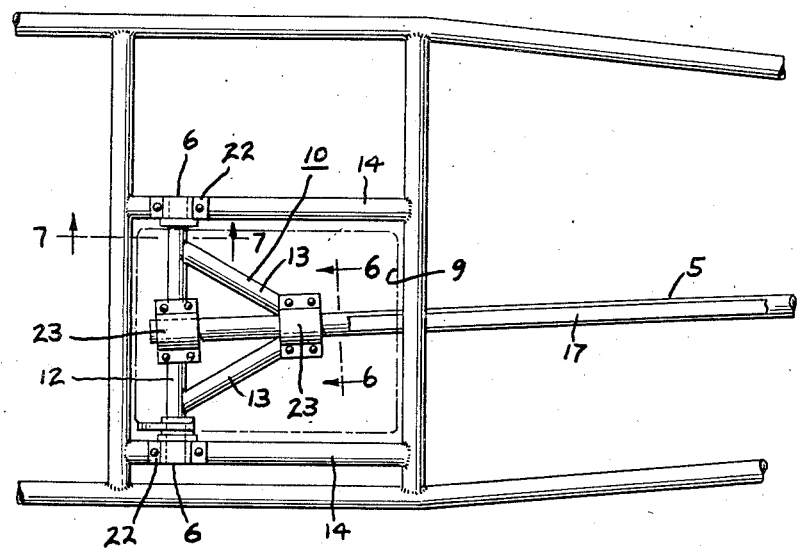
Fig. 5 is a detail plan view of the pivot connection between the pick-up arm and airplane frame.

In the drawings accompanying and forming part of this specification, certain specific disclosure of the invention is made for purposes of explanation, but it will be understood that the details may be modified in various respects without departure from the broad aspect of the invention.

Referring now to the drawings, the aircraft is illustrated as a modern airplane indicated by 1 provided with a hatch 9 in the floor of the fuselage. Pivotally mounted at the forward side of the hatch and near the center of gravity of the plane is a yoke 10 for the pick-up arm 5. The yoke 10 has a Y-configuration and suitable pivot devices 6 may be provided for pivoting the Y branches to suitable structural members within the fuselage.

Lever 7 may be connected to yoke 10 to manipulate it. Suitable stops or catches, indicated by 8 and 8', engage with the lever 7 to lock the pick-up arm 5 in desired position. The catches 8 serve to lock the pick-up arm in approximately the position shown in Fig. 1, which is the approximate pick-up position for engaging the load. The catches 8' are for the purpose of locking the arm in position up against the underside of the fuselage.

The yoke 10 and hatch 9 are located at the side of the fuselage and the pick-up arm 5 is placed at a slight angle to the axis of pivot 6 to permit the arm to lie within the confines of the horizontal projection of the fuselage when it is folded up against the bottom of the fuselage. If desired, the fuselage may be provided with a longitudinal recess indicated by 11 in Fig. 1 to receive and partially house the pick-up arm 5 in retracted position.

Figure 7:
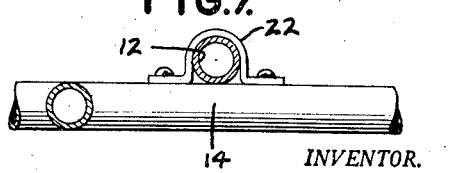
Fig. 7 is a section on the line 7—7 of Fig. 5 illustrating a bearing construction.

The yoke 10 is of Y or triangular configuration, comprising an axle member 12 and two diagonal members 13 suitably welded thereto. The axle member extends across the hatch 9 and rests on suitable seats on the structural members 14 secured to the fuselage, the seats having removable straps 22 and forming bearings for the pick-up arm (Fig. 7).

Figure 6:
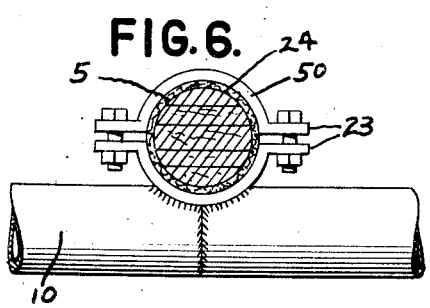
Fig. 6 is a section on the line 6—6 of Fig. 5 illustrating the manner of clamping the wood pick-up arm to the metal yoke.

The pick-up arm 5 is clamped to the yoke member 10 by suitable clamps 23, each clamp comprising a seat secured to the yoke member and a removable strap 50 for clamping the arm in its seat (Fig. 6). If desired, suitable cushions such as leather sleeves 24 may be interposed between the wooden pick-up arm 5 and the clamps 23 to prevent damage to the wood by the clamps.

The winch 61, on which a suitable amount of pick-up line 2 is wound, is preferably mounted forward of the hatch 9. This line is preferably unwound from the afterside of the winch 61 to facilitate removing the burden from the pick-up rigging when the winch is wound up to bring the burden into the plane as will hereinafter more clearly appear.

The pick-up arm 5 comprises a shaft which may be of the order of 15 feet in length. This shaft is made of comparatively light strong material and may be formed of a comparatively heavy forward section 15, which may be of oak or other suitable sturdy material, and a laminated after-section 16 which may be of somewhat lighter material, such as spruce wood. The shaft may be tapered, gradually decreasing in size from its upper to its lower end.

Secured to the afterside of the after-section of the pick-up arm 5 is a track 17 which may comprise a metal strip suitably shaped to space its edges from the body of the pick-up arm and suitably secured to the pick-up arm as by screws 41. Slidably mounted on the track 17 is a cleat or slider 18 having suitable flanges 19 extending around the edges of the track 17 to insure easy permanent sliding action. The upper end of track 17 is free of abutments and bends away from the pick-up arm as at 42 and is secured to yoke 10 by a strut 43. Portion 42 permits the operator to put the cleat onto the track in the beginning of the picking-up operation, as is explained hereinafter. The lower end of the track 17 is provided with spring detents 20 and 21. The first detent 20 permits the cleat to pass readily over it due to action of gravity and of the air stream but acts to restrict its return. The action of the lower detent 21 holds the cleat in operative position until it is forcibly removed from the track by the picking-up operation.

The provision of a heavy forward section and a lighter laminated after-section insures that the center of gravity of the cross-section of the pick-up arm is forward of its center of area and this, together with the laminated construction, prevents flutter and gives smooth operation.

The hook 3 is secured to the cleat 18 and is provided with a curved shank 29 passing from the rear of the pick-up arm around the side to the front thereof and ending in a bill 25 provided with staggered barbs 26 and 27. The hook is also provided with an eye 28 to which the line 2 is attached. By extending the bill 25 of the hook forward of the pick-up arm the load may be picked up without introducing any turning or twisting action on the pick-up arm and the staggered barbs 26 and 27 prevent accidental disengagement of the ground loop from the hook after engagement as explained hereinafter. This type of hook also makes it possible to have the track on the back of the pick-up arm where the track will not be damaged by contact with the pick-up loop nor will it be so free to accumulate ice or dirt.

The ground station (Fig. 1) may comprise two poles 30 set in the ground a suitable distance apart, say 20 feet, and having a suitable height, say 20 feet, to the upper end of which may be connected flags 36. The corners of the flags 36 may be provided with releasable couplings 35 which engage ground loop 31 having an upper ply 32 suspended between the poles and a lower ply 33 connected to the burden 34 which may rest upon the ground.

The winch 61 is suitably journaled upon a support within the fuselage. A suitable electric motor (not shown) is provided for paying out line 2 or winding it in. Suitable automatic braking devices are provided whereby, upon initial unwinding of the winch by pull on line 2, the winch rotates relatively freely. The braking device controlled by rotation of the winch automatically and gradually applies the brake until the maximum desired braking effort is obtained after which the winch may continue to rotate paying out additional line depending upon the pick-up conditions. The winch 61 and the manner of operating the same is disclosed more at length in the parent application.

*Operation and comments*

To use the pick-up system, the ground loop 31 is engaged with the releasable couplings 35 on the tops of the poles 30 and the burden 34 is connected to the ground loop, the burden resting on the ground. The plane is preferably provided with a pick-up operator in addition to the pilot.

The pick-up operator, before approaching the ground station, gets his pick-up apparatus in readiness for the pick-up operation. He lowers his pick-up arm slightly from its inoperative position up against the fuselage, he puts the cleat 18 on the upper end of the track 17 and operates the electric winch 61 to pay out enough line 2 to allow gravity assisted by the air stream to pull the cleat down to the position shown in Fig. 1 between detents 20 and 21.

The pilot of the plane brings the plane over the ground station with the arm directed between the poles 30 in such manner as to engage the pick-up arm with the upper ply of the ground loop above the hook. The ground loop then slides along the smooth front face of the pick-up arm until it engages the hook, the force of contact pulling the hook free of the pick-up arm and causing the pick-up line automatically to pay out off winch 61.

At the moment of impact of the hook with the ground loop the reel may rotate about one turn under light friction and then gradually to apply the brake 80. After, say, three more revolutions the brake may become fully applied.

At this point, the pick-up line 2 may be paid out about 30 feet, i. e., about 18 feet or more has been paid out at the time of engagement of the hook with the ground loop and the four revolutions of the drum act to pay out about 12 more feet. If the load is heavy enough, the drum will continue to pay out with the brake fully applied. With light loads there may be no further paying out after the brake is fully applied.

After the burden is accelerated to the speed of the plane, the pick-up operator then operates the winch 61 to reel in the line. The winch is then stopped holding the burden stationary, after which the burden is manually lifted inside the plane. The winch may be operated to unwind the ground loop so it may be detached from hook 3 and to put the reel in readiness for the next picking-up operation.

The placing of the pick-up pole or arm near the center of gravity of the plane puts the equipment and locates the pick-up operator at the most advantageous position with respect to the operation of the plane. The location of the arm forward also allows room to swing the arm up against the fuselage when it is folded out of use. The use of the laminated pole greatly increases the strength of the arm and helps eliminate flutter. The placing of the center of gravity of the pole forward of the center of area also eliminates flutter.

The placing of the guideway on the back of the arm leaves the front leading edge smooth for more efficient engagement of the ground loop. It also prevents dirt getting into the guideway when the ship is on the ground and reduces the opportunity for ice to form. The extending of the hook around to the front of the arm is accomplished without affecting the line of action of the hook or causing twisting stress on the arm. The staggered barbs on the end of the hook prevent accidental disengagement of the pick-up loop. The location of the pick-up line on the after side of the winch permits winding of the line to bring the burden further into the plane, facilitating handling of the burden by the pick-up operator.

While certain novel features of the invention have been disclosed herein, and are pointed out in the annexed claims, it will be understood that various omissions, substitutions and changes may be made by those skilled in the art without departing from the spirit of the invention.

What is claimed is:

1. In an air pick-up system, an aircraft, a pick-up arm supported by said aircraft, a track on the afterside of said arm, a hook slidably mounted on said track, said hook comprising a slider engaging said track and having an offset shank extending laterally around the side of said arm from said afterside and having a bill at the forward side of said arm.

2. In an air pick-up system, an aircraft, a pick-up arm supported by said aircraft, a track on said arm, a cleat slidably mounted on said track, a hook integrally secured to said cleat, a detent to releasably position said hook and cleat near the tip of the arm, said detent permitting said hook and cleat to disengage from said arm after contact with a ground line, a pick-up line secured to said hook, and take-up means in said aircraft for said pick-up line.

3. In an air pick-up system, an aircraft, an arm supported by said aircraft, a track on the afterside of said arm, a cleat comprising a body having forwardly extending flanges surrounding the sides of said track, and a hook integrally secured to said cleat, said hook having an offset shank and a bill extending forwardly of said arm, said bill having staggered barbs to prevent accidental disengagement of a line engaged by said hook.

4. In an air pick-up system, an aircraft, a pick-up arm supported by said aircraft, a track on the afterside of said arm, a cleat slidably mounted on said track, a hook secured to said cleat, yieldable devices to position said hook for engagement with a ground line, said hook having an offset shank extending laterally to one side of said arm and having a bill extending forwardly of said arm, said hook having a bight between said shank and said bill, a backwardly extending barb on said bill, and a forwardly extending barb on said shank, said bight and barbs forming an elongated recess to lodge the ground line.

5. In a pick-up system, an aircraft, a pick-up arm secured thereto, a pick-up device supported by said arm for engaging a burden while in flight, said arm comprising a shaft having a relatively heavy forward portion and a relatively light after portion whereby the center of gravity of the shaft section is forward of its center of area.

6. In a pick-up system, an aircraft, an arm pivoted thereto, a pick-up device supported by said arm for engaging a burden while in flight, said arm comprising a shaft having a relatively heavy forward portion and a relatively light laminated after portion whereby the center of gravity of the shaft section is forward of its center of area and tendency to flutter is reduced.

STUART CROSBY PLUMMER.